United States Patent [19]

Van Manen

[11] 4,310,366
[45] Jan. 12, 1982

[54] RESIN CAULKER MAKING

[75] Inventor: Dick T. Van Manen, Canandaigua, N.Y.

[73] Assignee: Voplex Corporation, Pittsford, N.Y.

[21] Appl. No.: 169,666

[22] Filed: Jul. 17, 1980

[51] Int. Cl.³ .................. B29C 27/08; B32B 1/10
[52] U.S. Cl. .................. 156/69; 156/73.5;
156/82; 156/244.13; 156/244.18; 156/244.24;
156/256; 156/294; 156/362; 156/423; 156/500;
156/567; 222/327; 264/68; 264/159
[58] Field of Search .............. 156/69, 73.5, 244.13,
156/244.18, 244.24, 256, 267, 82, 294, 362, 277,
423, 500, 556, 567; 222/327; 228/2, 60; 264/68,
159; 428/35

[56] References Cited

U.S. PATENT DOCUMENTS

| 2,483,028 | 9/1949 | Waldinger | 156/567 X |
| 2,800,945 | 7/1957 | Schilling | |
| 2,955,643 | 10/1960 | Shapero et al. | 156/567 X |
| 3,211,347 | 10/1965 | Phillips | 222/327 |
| 3,494,817 | 2/1970 | Whitecar | 156/567 |
| 3,673,033 | 6/1972 | MacDaniel et al. | 156/217 |
| 3,764,425 | 10/1973 | Neff et al. | 156/69 |
| 3,948,711 | 4/1976 | Piatek | 156/567 X |
| 3,982,980 | 9/1976 | Van Manen | 156/73.5 |
| 4,069,091 | 1/1978 | Van Manen | 156/498 |
| 4,140,569 | 2/1979 | Yealy | 156/580 |
| 4,226,652 | 10/1980 | Berg | 156/69 |
| 4,238,267 | 12/1980 | Konstantin | 156/567 X |

Primary Examiner—Robert A. Dawson
Attorney, Agent, or Firm—Stonebraker, Shepard & Stephens

[57] ABSTRACT

The apparatus and method for making a resin caulker 10 begins with continuous extrusion of a resin cylinder 15. A multimandrel indexing machine 20 has a receiving station 22 positioned to align an empty mandrel 21 with extruded cylinder 15 so a leading end 18 of extruded cylinder 15 advances onto empty mandrel 21. A cut off device 19 cuts cylinder 15 at a predetermined length to form a resin caulker barrel 11 supported on mandrel 21. Indexing machine 20 then moves cut off barrel 11 to an assembly station 23 and brings another empty mandrel 21 to receiving station 22. An end closure 12 is joined to cut off barrel 11 at assembly station 23; and successive stations 24–29 of the indexing machine finish, print, and dry the assembled caulkers while supported on mandrels 21.

12 Claims, 4 Drawing Figures

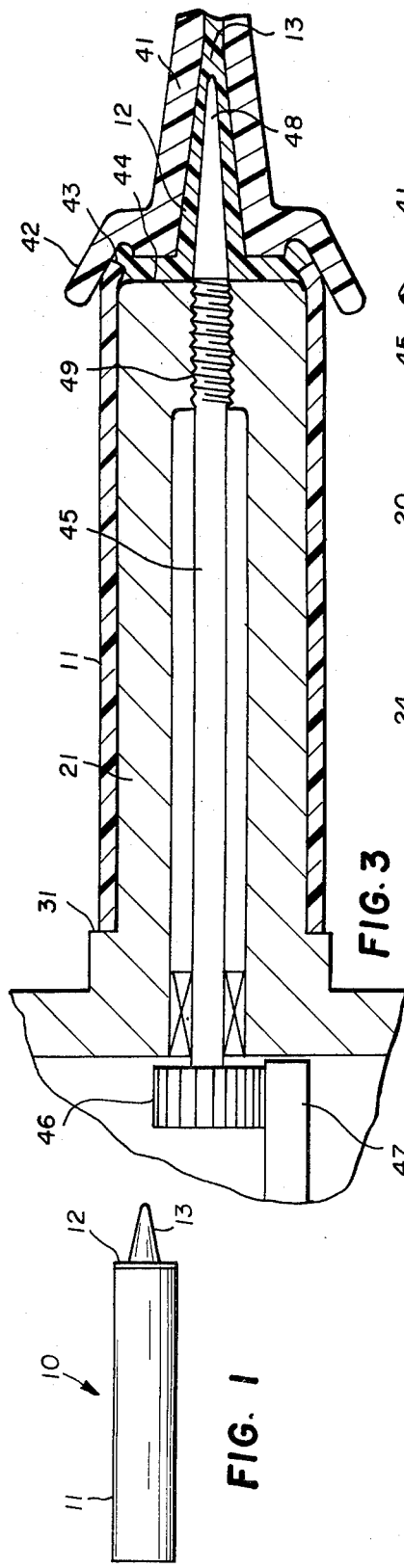
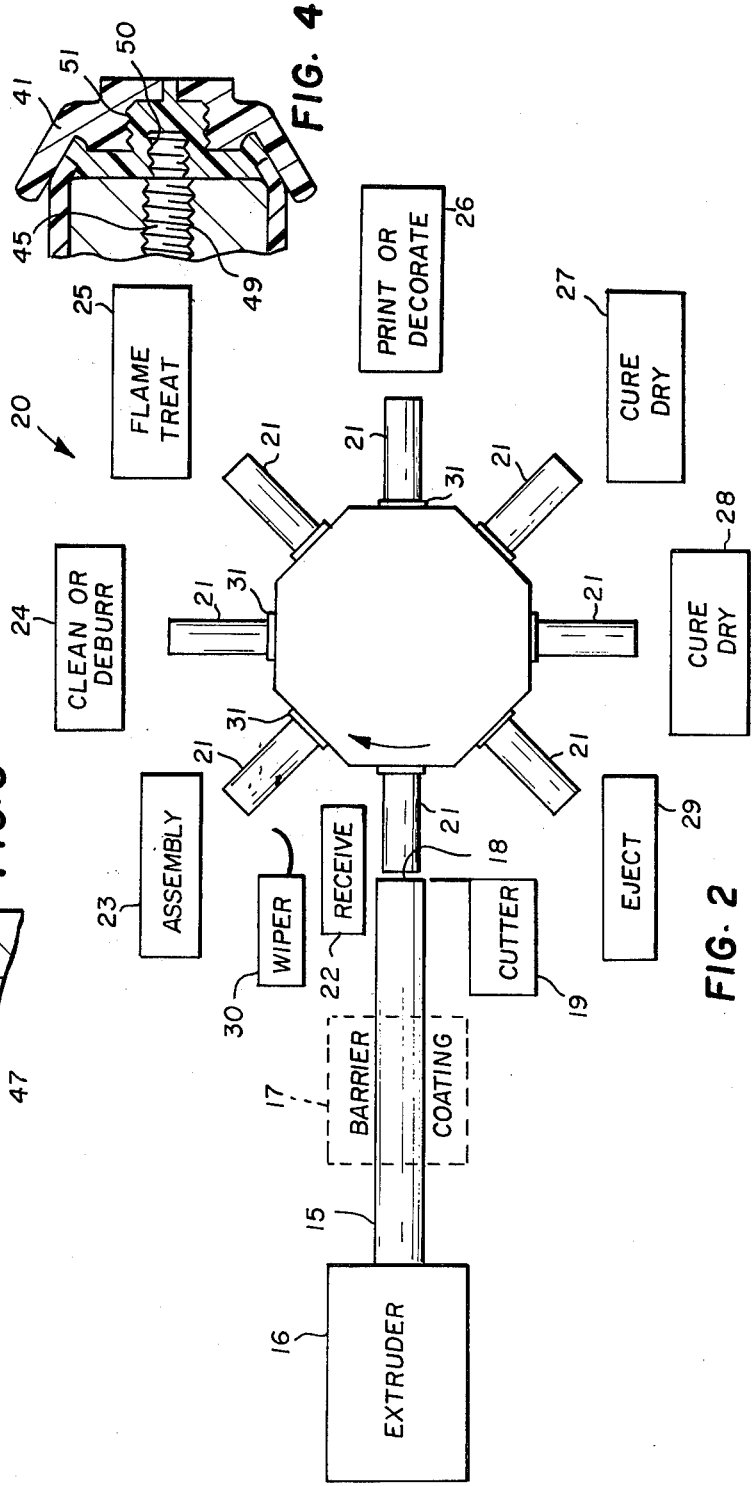

RESIN CAULKER MAKING

BACKGROUND

An excellent way of making resin caulkers for dispensing sealants, caulking compounds, etc. is to extrude a cylindrical tube, cut up the tube to form caulker barrels, and join end closures to the barrels. The accurate dimensions of extruded barrels insures that the sealing and dispensing plungers fit properly. End closures are typically injection molded of resin material and have a dispenser nozzle that the user can cut off to open up a dispensing tip.

My previous U.S. Pat. Nos. 3,982,980 and 4,069,091 and a competitor's U.S. Pat. No. 4,140,569 follow this general plan and use spin welding to join the end closures to the barrels. As laid out in a factory, these methods require several machines operating independently at different rates of speed performing the required operations to form completed caulkers; and components in various stages of production are accumulated, moved to each working location, and fed to machines in proper orientation for subsequent operations. More specifically, long, narrow cylinder extruders operate in one location to form cylinders that are cut off to produce an accumulation of caulker barrels; injection molding machines in another location form a supply of end closures; barrels and end closures are fed in proper orientation to an assembly machine that spin welds them together; and the assembled caulkers are then fed to printing machines that flame treat, print or decorate, and cure or dry.

I have discovered a simpler and more efficient way of making resin caulkers in an operation that is faster, takes less space, requires fewer workers, eliminates previous steps, and produces an improved result. My way of making caulkers readily accommodates different constructions, meets the rigorous standards of the caulker industry, and reduces manufacturing costs for a significant saving on an item that is made by the millions annually.

SUMMARY OF THE INVENTION

I continuously extrude a resin cylinder that advances toward a multimandrel indexing machine having a receiving station positioned to align an empty mandrel with the extruded cylinder. When the leading end of the cylinder is advanced partly onto the empty mandrel, I cut off a predetermined length of the cylinder and immediately index the machine to move the cut off barrel to an assembly station and bring another empty mandrel to the receiving station to receive the continually advancing cylinder. The mandrel supports that barrel throughout the remaining steps that include joining an end closure at the assembly station and cleaning, finishing, printing, and drying assembled caulkers at subsequent stations.

This not only eliminates the time and labor expended in accumulating, moving, and orienting parts but also eliminates the expense and space required for equipment to accomplish this. I time all the equipment and operations together so each step is accomplished quickly within a short index cycle of about one second for speedy production. My arrangement also allows end closures to be injection molded directly onto barrels as they are supported on mandrels that serve as internal mold parts to achieve more structural variability and better and more economical assembly.

DRAWINGS

FIG. 1 is a plan view of a typical caulker made according to my invention;

FIG. 2 is a schematic diagram of preferred steps and equipment for making caulkers according to my invention;

FIG. 3 is a partially schematic, cross-sectional view of a way of molding end closures to caulker barrels according to my invention; and FIG. 4 is a fragmentary view similar to FIG. 3 and showing an alternative molded end closure.

DETAILED DESCRIPTION

Caulker 10 as shown in FIG. 1 is a typical end product of the invention. It has an extruded resin barrel 11 and a molded resin end closure 12, and it can be made in many sizes and shapes. Barrel 11 is typically printed or decorated, and end closure 12 typically has a dispensing nozzle 13 that the user can cut off to form a dispenser tip. I prefer fusion welding for joining end closure 12 to barrel 11, and this can include molding end closure 12 directly to barrel 11 as explained below. Besides accommodating the existing structural possibilities for caulkers 10, my invention conveniently allows many other variations.

To make caulkers 10, I extrude a resin cylinder 15 directly onto a multimandrel indexing machine 20 having several stations for a series of operations. Extruder 16 forms cylinder 15 at a rate that is timed to the indexing of machine 20 to form a barrel length during each index cycle. Any processing of cylinder 15, such as a vapor barrier coating, can be accomplished at a station 17 en route to indexing machine 20.

Machine 20 has mandrels 21 shaped for fitting inside cylinder 15 and holding cut off lengths of barrels 11 at each of a succession of stations. Machine 20 also has a receiving station 22 where one of the mandrels 21 aligns with extruded cylinder 15 as it advances toward machine 20. The leading end 18 of cylinder 15 then advances onto mandrel 21; and a short distance outward from mandrel 21, cutter 19 cuts cylinder 15 at a predetermined length to form a barrel 11 supported on mandrel 21.

Machine 20 indexes immediately after barrel 11 is cut off from the leading end of cylinder 15 by cutter 19 to move barrel 11 to assembly station 23 and to move another empty mandrel 21 to receiving station 22 to receive the leading end 18 of cylinder 15 as it continues advancing toward machine 20. This pattern of operation allows machine 20 to receive barrels 11 at regular intervals matching its indexing cycle and to accomplish other caulker making steps at subsequent stations during each index cycle.

I prefer indexing machine 20 around a vertical axis so that mandrels 21 are disposed radially as illustrated in FIG. 2. This simplifies the arrangement of equipment for other processing steps at subsequent stations around machine 20. It also allows the basic arrangement to be doubled by extruding two vertically spaced cylinders 15 directly onto the mandrels of a pair of indexing machines located at upper and lower levels on the same vertical axis. Arranging a multimandrel machine to index around a horizontal axis parallel with cylinder 15 is also possible.

A wiper 30 positioned between stations 22 and 23 pushes a barrel 11 all the way onto mandrel 21 to be properly seated against shoulder 31 at assembly station 23. Length adjustments in barrels 11 can be accommodated by changes in shoulders 31.

An end closure is joined to a barrel 11 at assembly station 23 while barrel 11 is supported on mandrel 21. This can be done by fusion welding, and the generally known spin welding technique is satisfactory. This involves clamping a barrel 11 against rotation on mandrel 21, bringing a preformed end closure into engagement with barrel 11, and spinning the end closure against the barrel to create enough heat for welding. Another possibility explained more fully below is injection molding end closure 12 directly onto barrel 11 at assembly station 23.

Additional manufacturing steps at subsequent stations 24–29 are generally conventional and have previously been accomplished on either assembly or printing machines. Cleaning or deburring at station 24 is optional and depends on how the end closure is joined to the barrel. Flame treatment at station 25 prepares the barrel surface for printing accomplished at station 26. Two stations 27 and 28 are used for curing and drying, although one station might suffice; and the completed caulker is blown off mandrel 21 at eject station 29. All that remains beyond eject station 29 is to apply a sealant coating to the inside of the open ends of the caulker barrels and pack them for shipment to a customer for filling.

Besides joining a preformed end closure 12 to barrel 11 by fusion welding, the invention readily accommodates injection molding of an end closure 12 directly to barrel 11. This can be done by using mandrel 21 as an internal mold part closing the open end of barrel 11 and providing adequate support so that an external mold part 41 can close over barrel 11 as shown in FIG. 3 and form a cavity for injection molding end closure 12.

External mold part 41 preferably has a skirt 42 that engages the outer end 43 of barrel 11 and bends it inward over the outer end 44 of mandrel 21 so that barrel 11 is tightly squeezed inward around mandrel 21. This effectively uses barrel end 43 compressed between external mold part 41 and mandrel 21 for closing a mold cavity within which end closure 12 is molded. It also gives the forward end of the caulker a neat, turned in appearance and affords adequate area for a secure bond between end closure 12 and barrel 11.

To facilitate shaping the interior surface of end closure 12, a core rod 45 is threaded within mandrel 21 to move axially when rotated by a pinion 46 and a rack 47. As shown in FIG. 3, core rod 45 has a tip 48 shaped to form the interior of dispenser nozzle 13 on end closure 12. Core rod 45 is retracted before empty mandrel 21 indexes to receiving station 22 to avoid interfering with the advancing end 18 of cylinder 15. Rack 47 and pinion 46 then rotationally advance core rod 45 relative to threads 49 in mandrel 21 to move projection 48 to the position illustrated in FIG. 3 for molding dispenser nozzle 13.

In an alternative arrangement shown in FIG. 4, core rod 45 has a threaded end 50 disposed to form internal threads within an end closure 12 having a neck 51. Exterior threads on neck 51 can also be formed by rotating external die part 41, and many structural alternatives are possible in addition to the ones illustrated.

Molding end closures 12 directly to barrels 11 is not only fast and efficient, but leaves a clean and secure bond that does not have to be deburred. This also reduces waste and dust problems. It generally makes production more efficient by synchronizing molding and extrusion operations with assembly and finishing centered around a single machine requiring a small space and only three workers.

Because they are supported securely on mandrels 21 throughout all assembly and finishing operations, barrels 11 can be made slightly thinner than at present to save on material. Also, use of a rotationally retractable core rod 45 for molding end closures 12 directly to barrels 11 allows many structural variations at relatively low cost compared to previous methods.

I claim:
1. A resin caulker making method comprising:
   a. continuously extruding a resin cylinder;
   b. arranging a multimandrel indexing machine with a receiving station positioned to align an empty mandrel with said extruded cylinder;
   c. advancing a leading end of said extruded cylinder onto said empty mandrel at said receiving station;
   d. when said leading end of said cylinder has advanced partially onto said empty mandrel, cutting off said cylinder at a predetermined length to form a resin caulker barrel supported on said mandrel;
   e. indexing said machine after cutting off said barrel to move said cut off barrel to an assembly station and to bring another empty mandrel to said receiving station to receive said leading end of said cylinder;
   f. joining an end closure to said barrel supported on said mandrel at said assembly station; and
   g. using successive stations of said indexing machine for finishing, printing, and drying assembled caulkers supported on said mandrels.

2. The method of claim 1 including advancing said cut off barrel fully onto said mandrel as said mandrel indexes from said receiving station to said assembly station.

3. The method of claim 1 including extruding said resin cylinder along a horizontal path, and indexing said multimandrel machine on a vertical axis.

4. The method of claim 1 including using said mandrel as an internal die part at said assembly station, moving an external die part over an outer end of said barrel at said assembly station, and injection molding said end closure to said barrel between said internal and external die parts.

5. The method of claim 4 including using a rotatable core rod movable axially within said mandrel for forming an interior surface of said end closure.

6. The method of claim 5 wherein said core rod is shaped to form internal threads on said interior surface of said end closure.

7. A resin caulker making apparatus comprising:
   a. means for continuously extruding a resin cylinder;
   b. a multimandrel indexing machine arranged with a receiving station positioned for successively aligning an empty mandrel with said extruded cylinder;
   c. a cut off device operating in timed relationship with said indexing machine and said extruding means for cutting off predetermined lengths of said cylinder that are each partially advanced onto said empty mandrel at said receiving station to form resin caulker barrels that are then indexed to a subsequent station;
   d. said indexing machine having an assembly station subsequent to said receiving station;

e. means for joining end closures to said barrels supported on said mandrels at said assembly station; and f. stations of said machine subsequent to said assembly station being arranged for finishing, printing, and drying assembled caulkers supported on said mandrels.

8. The apparatus of claim 7 including a wiper arranged for advancing said barrels all the way onto said mandrels as said mandrels index from said receiving station to said assembly station.

9. The apparatus of claim 7 wherein said cylinder is extruded along a horizontal path, and said machine is arranged to index on a vertical axis around which said mandrels are radially oriented.

10. The apparatus of claim 7 wherein said joining means includes an external die part arranged to fit over ends of said barrels supported on said mandrels serving as internal die parts at said assembly station, and means for injecting resin between said die parts to mold said end closures onto said barrels.

11. The apparatus of claim 10 including rotatable core rods movable axially within said mandrels for forming interior surfaces of said end closures.

12. The apparatus of claim 11 wherein said core rods are shaped for forming internal threads on said interior surfaces of said end closures.

* * * * *